Aug. 15, 1939.　　　W. W. CRILEY　　　2,169,894

METHOD OF FORMING BLANKS

Filed April 29, 1937　　　3 Sheets-Sheet 1

INVENTOR.
William W. Criley
BY Fay, Oberlin & Fay
ATTORNEYS

Aug. 15, 1939.  W. W. CRILEY  2,169,894
METHOD OF FORMING BLANKS
Filed April 29, 1937   3 Sheets-Sheet 2

INVENTOR.
William W. Criley.
BY Fay, Oberlin & Fay
ATTORNEYS.

Aug. 15, 1939.　　W. W. CRILEY　　2,169,894
METHOD OF FORMING BLANKS
Filed April 29, 1937　　3 Sheets-Sheet 3
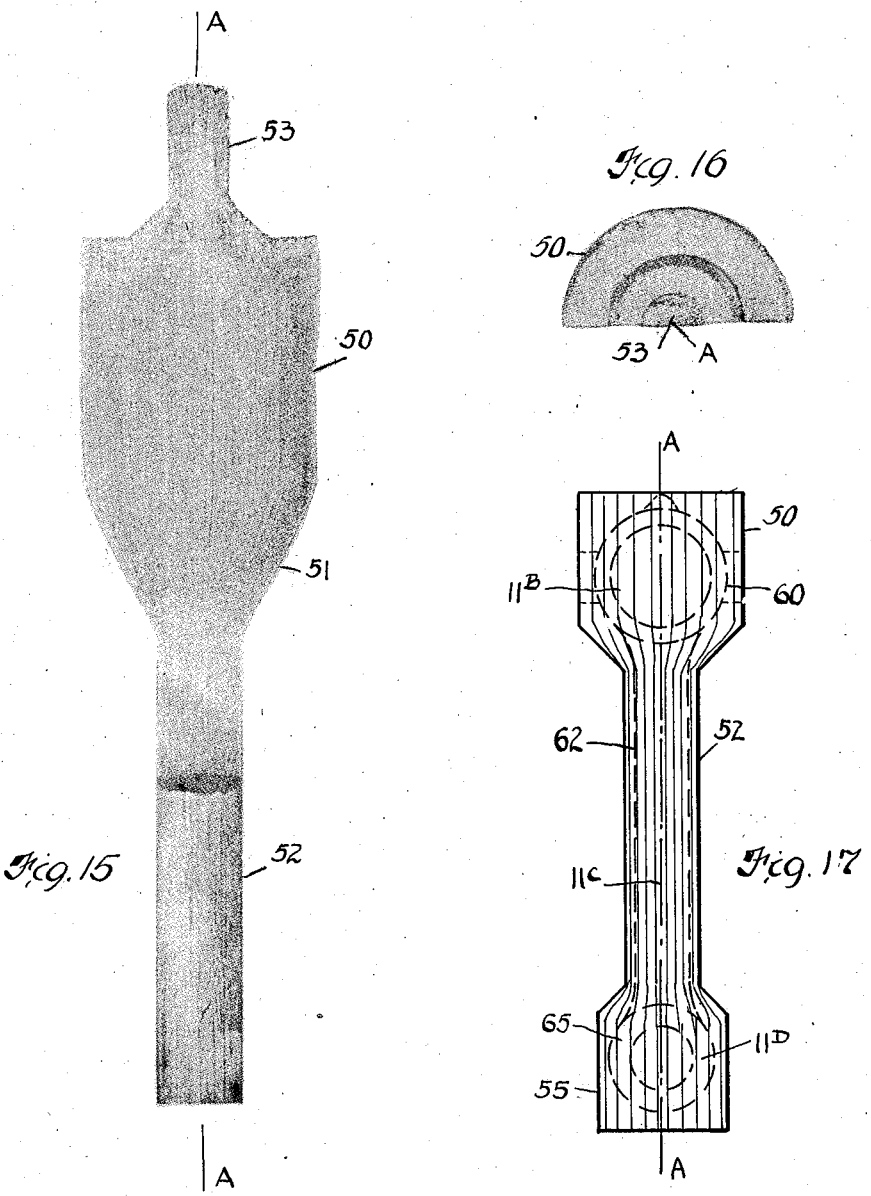
Inventor
William W. Criley
BY Fay, Oberlin & Fay
Attorneys Patented Aug. 15, 1939

2,169,894

UNITED STATES PATENT OFFICE 2,169,894

METHOD OF FORMING BLANKS

William W. Criley, Cleveland, Ohio

Application April 29, 1937, Serial No. 139,754

8 Claims. (Cl. 29—156.5).

In forging connecting rods for automobiles, and articles of a similar nature where two enlarged portions must be connected by a narrower part, a blank is usually forged consisting of two enlarged heads connected by a shank or beam. These heads are usually of different size, the larger becomes the crank-pin bearing in the finished rod, and the smaller the wrist-pin bearing. This blank is then fabricated into a connecting rod in a finishing press or hammer.

In forming such articles it is important to maintain the fiber disposition of the completed article parallel, so far as possible, to the longitudinal axis, and homogeneously disposed throughout all cross sections. Similarly, where changes of fiber direction are necessary, they should conform as nearly as may be to the contour of the completed structure.

In elongating a blank by hammer strokes the macro-structure is given a wavy character due to lateral deformation at the areas of impact. Furthermore, such hammering tends to produce a sharp angular change of direction of the grain lines at each junction of a reduced end with a larger portion of the blank. Such sharp corners and interruption of the fibers in the blank causes weakness of the connecting rod at the junctions of the bearing portions with the shank or beam of the rod.

A further difficulty of hammering as compared with my new dieing method is that in the hammering process neither the initial slug nor the blank ready for finishing can be so accurately sized with respect to the quantity of metal required as with my method. Consequently a greater amount of excess must necessarily be allowed if the blank is to be hammer formed than if it is to be die formed. Consequently, my process, giving a more perfect distribution of the metal, is economical in respect to the quantity of metal required in the initial slug to produce a finished article of given size.

A still further disadvantage of hammer forming is that in hammer forming the blank is given a series of lateral blows on one side, then revolved 90° and given a further series of blows, and so on. This treatment sets up internal spreading stresses which manifest themselves in a spongy structure of the metal near the longitudinal central axis, sometimes going so far as to produce an actual pipe at the interior. This effect is known as overdrawing, and is avoided in the present invention.

The time required for the production of a blank ready for finishing is materially lessened by my invention because the hammering requires a large number of blows in each position with changes of position between the series of blows, whereas my invention permits the slug to be transformed into a blank ready for finishing by a few dieing and forging passes, a total of three in the preferred illustrative embodiment herein described.

For the accomplishment of the advantageous results and avoidance of the evils above discussed, my invention comprises treatment beginning with the initial slug or piece of stock and ending with the blank ready for finishing operations, with the fiber disposition or macrostructure in such blank conforming to the requirements above indicated. In such a blank and in the connecting rod made therefrom there is an avoidance of diagonal fiber directions in the beam portions of the rod, of slippage planes at angles to the direction of principal stress, of internal pipes, breaks, flaws or spongy structure, and of similar weaknesses, such as are often produced in blanks formed by the hammer method of fullering. My invention maintains continuity of fiber by avoiding fiber interruptions, sharp bends or folds in the fiber, and like causes of weakness.

To the accomplishment of the foregoing and related ends, said invention, then, consists of the means and method hereinafter fully described and particularly pointed out in the claims.

The annexed drawings and the following description set forth in detail certain processes embodying the invention, and suitable mechanism for performing the processes, such disclosed means constituting, however, the preferred but not the exclusive means by which the principle of the invention may be practiced.

In the accompanying drawings, which represent the steps of my process and indicate in partly diagrammatic style appropriate mechanism for performing it, Fig. 1 is an elevation of a slug from which the blank may be formed, the slug here shown being a section cut from a bar and partly broken away to show the preferred fiber direction in such slug;

Fig. 4 is specifically the form shown in process in Figs. 2 and 3;

Figure 2:
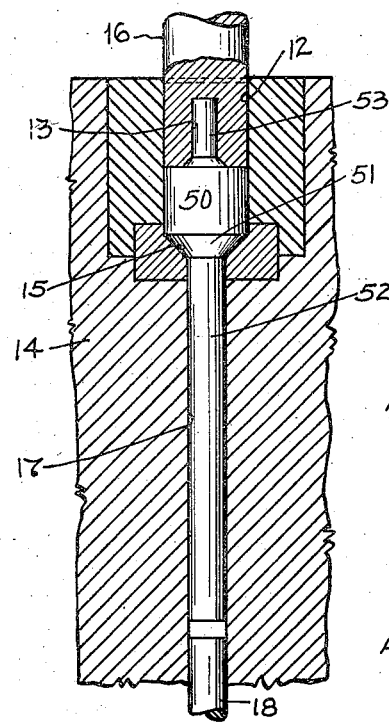
Fig. 2 is a section through a suitable extruding apparatus, also illustrating in elevation my blank as shaped by the first pass.
Figure 4:
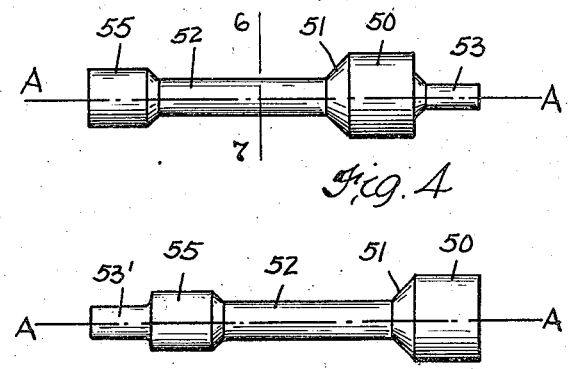
Figs. 4 and 5 are elevations of completed blanks ready for the finishing press, the formations illustrated being alternative.
Figure 5:
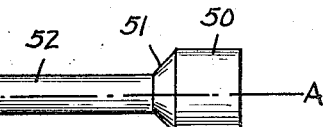
Figure 3:
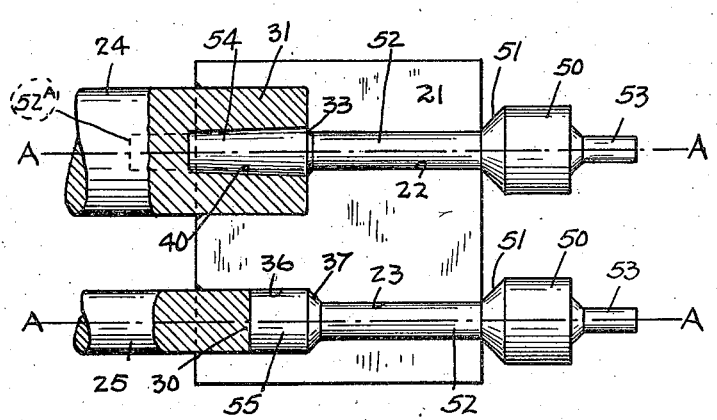
Fig. 3 shows, partly in section and partly in elevation, suitable mechanism for the second and third blank-forming passes, with a blank at the completion of each of these stages, one die member being omitted.
Figure 8:
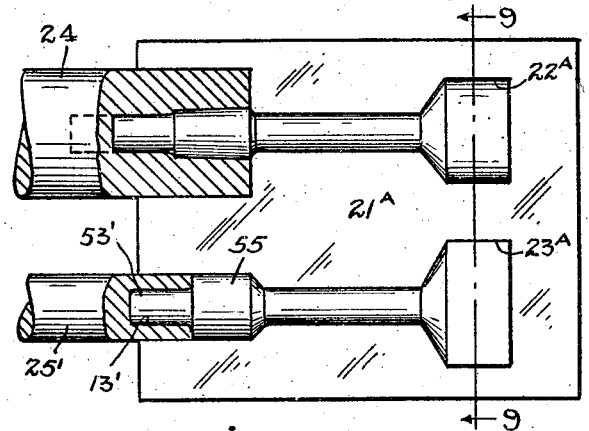
Figure 9:
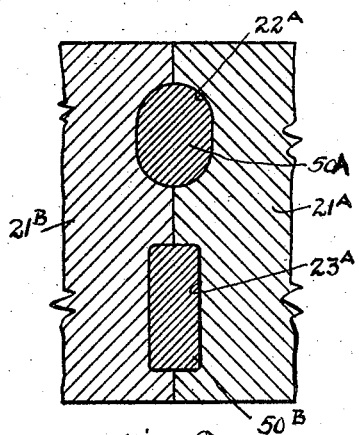
Figure 10:
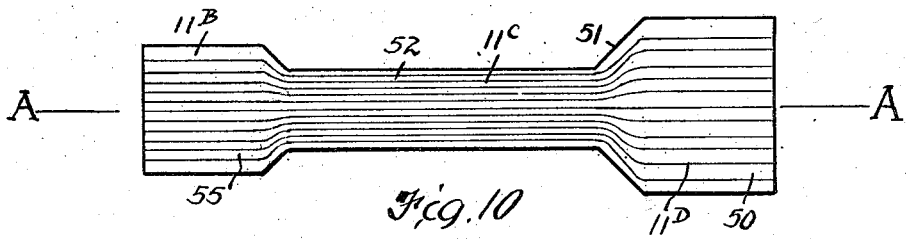
Figure 11:
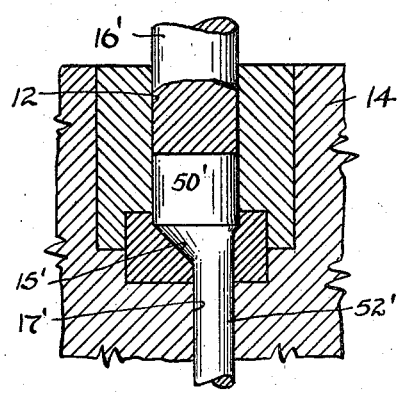
Figures 13, 14:
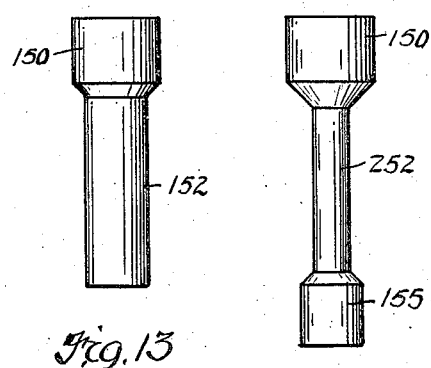
Figure 12:
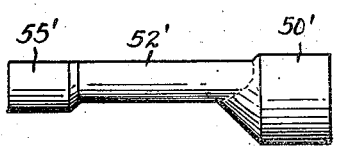

Fig. 8 corresponds to Fig. 3 but shows an alternative form, flattening the head of the blank during the second and third passes, omitting one die member;

Fig. 9 is a section on the plane 9—9 of Fig. 8, in the direction of the arrows, and indicating both gripping dies;

Fig. 10 is a longitudinal median section through the blank of Fig. 4 or Fig. 5, on a larger scale, omitting the tong hold, and illustrating in somewhat diagrammatic fashion the fiber disposition;

Fig. 11 corresponds to Fig. 2 but illustrates a heading tool which does not form a tong hold, and the first pass of a blank with an offset shank;

Fig. 12 is an elevation corresponding to Figs. 4 and 5, but showing a modified blank;

Fig. 13 is an elevation of another form of modified blank as formed by the first pass;

Fig. 14 is an elevation of the blank of Fig. 13 after swaging and ready for finishing operations;

Fig. 15 is a central longitudinal section through the head and part of the shank of the blank of Fig. 2 etched to show the macrostructure, and photographed natural size;

Fig. 16 shows the upper end of Fig. 15, illustrating the uniformity of fiber distribution;

Fig. 17 is a longitudinal median section illustrating the relation of a blank and the connecting rod to be made therefrom.

Figure 1:
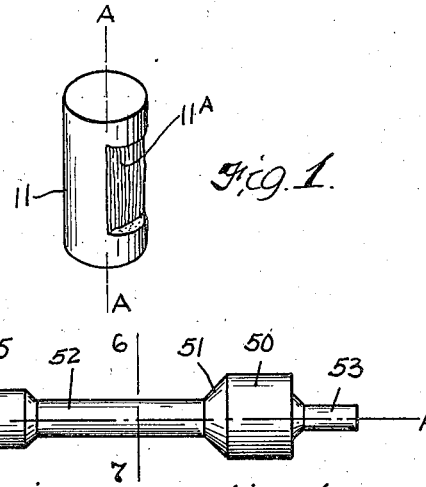

Briefly the method of my invention comprises a succession of operations upon a slug or bar stock blank of any suitable shape, that illustrated in Fig. 1 being cylindrical, whereby the slug is formed into a completed blank such as shown in Figs. 4, 5, and 10, having a larger head 50 and smaller head 55 connected by a shank portion 52, with the fiber disposition 11B, 11C, 11D throughout all parts parallel to the longitudinal axis A—A, and free from sharp bends or breaks in the continuity, also free from any interior sponginess or tendency toward piping. This blank is later formed by the usual finishing die operations or finishing hammer operations into a connecting rod wherein the larger head 50 becomes the crank-pin bearing 60, the smaller head 55 becomes the wrist-pin bearing 65, and the shank 52 becomes the beam 62, all as shown in dotted lines in Fig. 17. The parallel fiber arrangement and the uniform density, which are best illustrated in Fig. 15, are thus carried into the finished rod, avoiding wavy or sharply changed fiber directions and thus obtaining maximum strength in the finished connecting rod.

Since my process is one of extrusion and die formation, without hammering, the quantity of material in the blank can be kept more closely to the requirements of the final connecting rod, and the operation can also be carried on more speedily since there are no hammer blows and turnings of the blank between series of blows needed.

Although I have illustrated my invention as applied with the fiber structure of the completed blank tending in the same direction as shown at 11A in the initial slug of Fig. 1, this is not essential to the carrying out of my invention, because the repeated extruding dieing operations place the fibers in substantially paraxial position in the finished blank whatever may be their original direction.

In the preferred process of carrying out my invention, a stock slug 11, heated to forging temperature, is placed in the upper part 12 of the die cavity, Fig. 2, of a forging press. In the present illustration the complete die cavity comprises the upper portion 12 of larger diameter, an intermediate tapering portion 15, and a lower portion 17 of smaller diameter, all three portions concentric. The lower portion 17 extends entirely through the die 14 and is entered at the bottom by an ejector pin 18.

After the insertion of the stock 11, a forming tool 16 enters the cavity 12, forcing the slug 11 downward, and extruding the metal into the lower portion 17, thereby forming a stem 52. This stem 52 remains attached by the conical portion 51 to so much of the slug 11 as is left in the upper die portion 12. Thus the first pass brings the blank into the form of a shank 52 integral with a larger head 50, the two being connected by a tapering shoulder 51. In the specific mechanism shown in Fig. 2, the forming tool 16 is apertured inward from its face by a counterbore 13 which forms a small projection 53 on the large head 50 for a tong hold. Alternatively such tong hold may be formed on the smaller head 55 and by a later pass, as at 53' in Fig. 8, or it may be omitted entirely if the finishing is to be done in such types of mechanism that a tong hold is not necessary.

After the blank has been formed to the shape shown in Figs. 2 and 15, the header 16 is withdrawn the necessary distance, and the ejector pin 18, rising, forces the blank out of the die. The die of Fig. 2 is preferably solid die, while the dies of Fig. 3 are preferably of two parts.

After the blank has been formed as shown in Fig. 2, it is transferred to further apparatus or further parts of the same apparatus for the intermediate and finishing passes, as shown in Fig. 3.

Fig. 3 illustrates the two stages of the work in such subsequent apparatus, that is, the second and third passes. In Fig. 3 only the working face 21 of the stationary part of an opening type of die is shown, with work in the impressions 22, 23 thereof, and heading tools 24, 25 at the completed end of the working stroke. In the figure the upper half represents the second pass and the lower half the third, final pass. A suitable mechanism for the purpose is a conventional upset forging machine with a multiple-tool header slide, the general type being illustrated in Fig. 4 of Criley Patent No. 1,786,006. In the illustrative embodiment of the present invention only two heading tools are employed, for the reason that in making small connecting rods, such as used for automobile engines, my improved blank can be made by three passes. However, I do not limit myself to any specific number.

Figure 6:
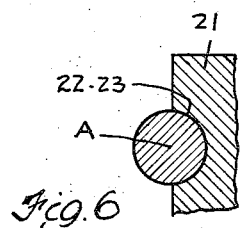
Figs. 6 and 7 represent alternative cross sections on the plane 6—7 of Fig. 4 looking in either direction and also showing part of one die in section.
Figure 7:
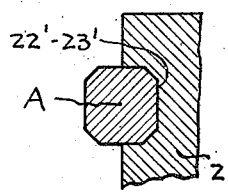

The grooves 22, 23 may be either round as in Fig. 6, conforming to the shape of the shank as originally extruded or flat-sided as at 22', 23' Fig. 7, to further prepare the shank for ultimate formation into the beam of the rod, or of whatever section is desired. The inner end of the impression 22 is enlarged as at 31 to receive and guide the forward end of the second pass heading tool 24. The portions 31 and 22 are connected by a slightly tapered enlargement 33 to avoid a sharp shoulder.

The header 24 is centrally bored as at 40 inwardly from its face, the bore having a sufficient draft or taper to withdraw readily from the gather 54 which it forms upon the headless end of the shank 52. In Fig. 3 the blank initially is of the form shown at 50—51—52, Fig. 2. The action of the header 24 is to gather the free end 52A of the shank (dotted in Fig. 3) into the shape 54, the application of force being along the axis A—A. The amount of metal which can be gathered at one stroke depends upon considerations well understood in forging practice. Under ordinary circumstances one gathering pass and one finishing pass are sufficient, but it will be understood that under appropriate conditions the gathering stroke may be omitted or, on the other hand, more than one gathering stroke may be necessary.

The blank with the gathered end is transferred to the final die impression 23, where the gathered portion 54 is acted on by a final heading tool 25 which, again moving axially to the blank, reduces the length and increases the diameter of the portion 54 into a head 55, which becomes the wrist-pin bearing of the completed connecting rod. The final die impression comprises the section 23 of the same length as 22, a flaring section 37, and a section 36 of larger diameter than 23 but concentric therewith. The working face 30 of the tool 25 is flat, as shown, in case the tong hold 53 is on the larger head as shown, or in case no tong hold is needed.

The second pass header tool 24 and third pass header tool 25 may conveniently be carried by the same header slide and thus operated simultaneously.

The blank is now ready to be transferred to a finish forming press or hammer where it is forged, forming the smaller head 55 into the wrist-pin connection 65, the shank 52 into the beam 2 of the finished connecting rod, and the larger head 50 into the crank-pin connection 60, Fig. 17. It will be appreciated that the sizes and proportions of parts in the finished blank of Fig. 4, 5 or 10 are varied according to the requirements of the ultimate finished product. For example the head 50 will be larger or smaller according to whether the cap at the connecting rod bearing is or is not initially formed integral with the rod. As hereafter explained, either or both heads may be eccentric with respect to the longitudinal axis A—A, the heads 50' and 55' in Fig. 12 being examples.

It will be appreciated that the principles of my invention may be applied to produce modified forms of blanks according to the designs of connecting rods to be made, and also that certain variations in the steps of the invention may be resorted to without departing from the spirit and principles thereof. It is not feasible to describe all such possibilities in detail, but some will now be pointed out.

In case the tong hold is to be formed on the smaller end 55 as at 53', Fig. 5, the extruding forming tool 16 has a flat working face as shown at 16' Fig. 11, and its length of stroke is of course so regulated as to force the excess metal required for the tong hold 53' (if any) down into the shank 52. When this arrangement is employed, and a tong hold is required, the third pass forming tool is modified as at 25' Fig. 8 by the inclusion of a counterbore 13' in the working face to form the tong hold 53'.

Although the blank is preferably made of round cross section, as shown in Figs. 4 and 6, it may if desired be wholly or in some parts of other cross section, various possibilities being indicated in Figs. 7 and 9.

It is frequently advantageous to flatten the larger head 50 during the second and third passes. This is readily accomplished where corresponding dies are used, and is illustrated in Figs. 8 and 9. In these figures the stationary die 21A is extended further forward so as to include cavities 22A and 23A to impart to the head 50 its successive flattened forms 50A and 50B. In Fig. 9 the movable die 21B is also shown.

For certain purposes, as already mentioned, it is necessary that the shank be eccentric with respect to one or both heads. Fig. 11 illustrates a modification of the apparatus of Fig. 2 for such a formation of a shank 52' eccentric with respect to a head 50'. Here the variation from the apparatus of Fig. 2 comprises an offset lower cavity 17' connected to the upper cavity 12 by an irregularly tapered connecting portion 15'. The operation is otherwise similar to that already described in connection with Fig. 2. Obviously an offset could be applied on the end 55 by appropriate modification of the apparatus of Fig. 3 or Fig. 8. Fig. 12 is a side view of a blank with both heads so offset and corresponds otherwise to Figs. 4, 5 and 10.

It is thus apparent that the generally paraxial direction and homogeneous density of fiber disposition which were given to the blank in the extruding operation of Fig. 1 have not been lost in the finished blank of Fig. 10 or in the completed connecting rod of Fig. 17, and that the only deviations from direct fiber disposition are those necessarily due to the enlargements of the heads 50 and 55. Discontinuity, waviness of direction, or interruption of fiber due to the lateral action of repeated hammer blows, and the internal disruption which follows from lateral hammering accomplished by turning the blank upon its axis between successive series of blows, are all avoided. Thus when the connecting rod 60—62—65 is formed, the fiber structure is parallel to the axis of all parts and follows the contour of the rod at the junctions of the bearings with the beam 62. There are no wavy cleavage faces in the fiber structure of the finished rod, and no tendency to pipe or become spongy about the axis A or elsewhere internally. The completed rod is thus of full possible strength and has been formed with economy of time and of metal.

Further possibilities of my invention are illustrated by Figs. 13 and 14, wherein Fig. 13 illustrates the results of a first pass with a head 150 from which there has been extruded a shank 152 relatively shorter and thicker than the shank 52 on the head 50 of the preferred embodiment. The thickness of the head 150 is indicated by the dimension A and the thickness of the shank by the dimension B. The shank 152 is now lengthened and thinned by a moderate swaging operation, or one or two blows only of a fuller hammer, applied between the head 150 and the extreme end of the shank thus leaving a smaller head 155 having substantially the initial shank thickness B, connected with the larger head 150 by the modified shank 252 which for purposes of comparison may be considered as being about the same thickness as the shank 52 in the preferred form. This modification avoids the objections which have hitherto been described as attached to the hammering operations for the reason that such a slight amount of hammering is needed, only one or two blows are required, as compared with several series of many blows each and a quarter turn between the series which characterizes the operation of completely shaping the blank by hammering and similar processes.

From the foregoing it is apparent that my process in all its various modifications imparts to the blank a longitudinal fiber tendency which is maintained through the steps which follow. This predominant longitudinal tendency, although obviously modified at portions where there is a change of figure of the blank, prevents the formation of folds, breaks or discontinuities in the macrostructure.

Other modes of applying the principle of my invention may be employed instead of the one explained, change being made as regards the means and steps herein disclosed, provided those stated by any of the following claims or the equivalent of such stated means be employed.

I therefore particularly point out and distinctly claim as my invention:

1. The method of making connecting rods which consists in heating a blank, forming part thereof into a head, extruding part thereof into a shank portion, and upsetting another head on said shank portion without reducing the cross-section of said shank portion, and subsequently applying lateral pressure always in the same direction, thereby die forging the blank so formed into a connecting rod whereof the crank-pin bearing is formed from the first-named head, the wrist-pin bearing is formed from the second-named head, and the beam of the rod is formed from the remaining extruded portion.

2. The process of forming a blank for connecting rods and the like which comprises taking a slug wherein the fiber lines extend longitudinally, die expressing a portion of said blank in the direction of said fiber lines into a shank of reduced cross section and leaving the rest of the blank as a head upon the shank, with fiber lines in said head and in said shank paraxially disposed with respect to the longitudinal axis, followed by gathering the end of the shank opposite the head, followed by a further shortening and thickening of said gathered end also by axially directed pressure.

3. The process of forming a blank for connecting rods and the like which comprises taking a slug wherein the fiber lines extend longitudinally, shaping a portion of said slug into a head while die expressing therefrom a concentric shank of reduced diameter, with fiber lines in said head and in said shank following the general direction of the fiber lines in the original slug and symmetrically disposed with respect to the longitudinal axis of the blank, followed by gathering the end of the shank opposite the head.

4. The process of forming a blank for connecting rods and the like which comprises taking a cylindrical slug, forming a portion of said slug into a head simultaneously with die expressing a portion of said slug into a reduced shank eccentrically disposed upon said head, with fiber lines in said head and in said shank longitudinally disposed, followed by upsetting the end of the shank opposite the head by force applied parallel to the axis of the shank.

5. The method of making a connecting rod which comprises extruding part of an axially-fibered slug axially into a reduced shank off-center from said head by endwise pressure in a die but leaving sufficient of said slug not extruded to form a crank-pin bearing in the finished rod, ejecting said partly formed blank from said die, transferring the same to other die means, upsetting part of the free end of said shank in said other die means into a head off-center from said shank and of size to form a wrist-pin bearing in the finished rod, and forging said double-headed blank into a finished connecting rod by lateral pressure without distortion of the general axial fiber disposition.

6. The method of making connecting rods and the like which consists in heating a blank, forming part thereof into a head, die expressing part thereof into a shank integral with said head, followed by flattening said head and forming a head on said shank portion smaller than said first-named head, and subsequently die forging the blank so formed into a connecting rod whereof the crank-pin bearing is formed from the head originally left, and the wrist-pin bearing is formed from the second-named head, and the shank is formed from the unmodified extruded portion.

7. A method of connecting rod manufacture which comprises taking a piece of stock having axial fiber lines, die expressing a portion of said stock in the direction of said fiber lines into a shank of reduced diameter, while leaving the remainder of said stock of original diameter but reduced length as a head on said shank, upsetting a head on the other end of said shank by axially reducing the length of a portion thereof while increasing the diameter of said portion, and applying lateral pressure to the blank thus formed, thereby shaping said heads into bearing portions and said shank into beam cross section, all without substantially disturbing the axial and parallel fiber disposition in the blank.

8. The method of making a connecting rod which comprises the extruding part of a slug axially into a reduced shank by endwise pressure in a die while forming the remainder of said slug into a head, ejecting said partly formed blank from said die, transferring the same to another die, gathering part of the free end of said shank in said other die, further upsetting said gathered end into a head, and forging said double-headed blank into a finished connecting rod by lateral pressure without distortion of the general axial fiber disposition.

WILLIAM W. CRILEY.